United States Patent
Abdelfattah et al.

(10) Patent No.: US 11,381,183 B2
(45) Date of Patent: Jul. 5, 2022

(54) COMPRESSOR FOR GENERATING COMPRESSED AIR, COMPRESSED AIR SUPPLY SYSTEM, PNEUMATIC SYSTEM, AND METHOD FOR OPERATING A COMPRESSOR

(71) Applicant: WABCO GmbH, Hannover (DE)

(72) Inventors: Mohamed Abdelfattah, Braunschweig (DE); Reiner Bleil, Peine (DE); Robert Sohn, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 528 days.

(21) Appl. No.: 15/562,420

(22) PCT Filed: May 18, 2016

(86) PCT No.: PCT/EP2016/000824
§ 371 (c)(1),
(2) Date: Sep. 28, 2017

(87) PCT Pub. No.: WO2016/192837
PCT Pub. Date: Dec. 8, 2016

(65) Prior Publication Data
US 2018/0287531 A1 Oct. 4, 2018

(30) Foreign Application Priority Data
May 29, 2015 (DE) .................... 10 2015 006 711.7

(51) Int. Cl.
*H02P 7/29* (2016.01)
*H02K 11/33* (2016.01)
(Continued)

(52) U.S. Cl.
CPC ............ *H02P 7/29* (2013.01); *B60G 17/0408* (2013.01); *B60G 17/052* (2013.01);
(Continued)

(58) Field of Classification Search
CPC .. H02P 7/29; H02P 1/18; H02K 11/33; B60G 2500/02; B60G 17/0521; B60G 2202/416; B60G 2206/0116; B60G 17/0523
See application file for complete search history.

(56) References Cited

U.S. PATENT DOCUMENTS 5,923,143 A * 7/1999 Cosan ..................... H02P 1/423
318/729
6,211,681 B1 * 4/2001 Kagawa .................. B60L 50/61
324/426
(Continued)

FOREIGN PATENT DOCUMENTS

CN     102666152 A    9/2012
DE     2758309 C2    7/1979
(Continued)

OTHER PUBLICATIONS

Mihai Albu: "One and Two Quadrant Choppers", Feb. 3, 2014 (Feb. 3, 2014), XP002760195.

*Primary Examiner* — Bickey Dhakal
*Assistant Examiner* — Bradley R Brown
(74) *Attorney, Agent, or Firm* — Leydig, Voit & Mayer, Ltd.

(57) ABSTRACT

A compressor system for generating compressed air for a compressed air supply system in a vehicle. The compressor system includes a brushed direct current electric motor (BDC electric motor); a compressor configured to be driven by the BDC electric motor; and a control unit for controlling the BDC electric motor and allocated to the BDC electric motor so as to delimit an operating current of the electric motor. A free-running current path is allocated to the control unit, the free-running current path being configured to delimit the operating current of the electric motor in a variable manner. A switch controller is allocated to the control unit, the switch controller being configured to
(Continued)

specify a switched-on time period (t_ON) and/or a switched-off time period (t_OFF) for the electric motor in a variable manner.

29 Claims, 9 Drawing Sheets

(51) Int. Cl.
    *H02P 1/18*     (2006.01)
    *B60G 17/052*     (2006.01)
    *B60G 17/04*     (2006.01)

(52) U.S. Cl.
    CPC ..... *B60G 17/0521* (2013.01); *B60G 17/0523* (2013.01); *H02K 11/33* (2016.01); *H02P 1/18* (2013.01); *B60G 2202/416* (2013.01); *B60G 2206/0116* (2013.01); *B60G 2500/02* (2013.01); *B60G 2500/205* (2013.01)

(56) References Cited

U.S. PATENT DOCUMENTS

| | | | |
|---|---|---|---|
| 9,142,977 B1* | 9/2015 | Chang | H02J 7/0071 |
| 2003/0108430 A1* | 6/2003 | Yoshida | F04B 35/045 |
| | | | 417/44.11 |
| 2004/0189226 A1* | 9/2004 | King | B60L 50/51 |
| | | | 318/375 |
| 2007/0137626 A1 | 6/2007 | Turner | |
| 2012/0193845 A1* | 8/2012 | Yamanaka | F04B 39/066 |
| | | | 417/415 |
| 2013/0342142 A1* | 12/2013 | Marcinkiewicz | H02P 29/0241 |
| | | | 318/400.11 |
| 2015/0303849 A1* | 10/2015 | Schmidtlein | H02P 7/291 |
| | | | 318/501 |
| 2015/0345490 A1 | 12/2015 | Briemeier et al. | |
| 2016/0133414 A1* | 5/2016 | Bock | G01R 31/3274 |
| | | | 361/187 |
| 2016/0173008 A1* | 6/2016 | Waltuch | H02P 1/04 |
| | | | 318/484 |

FOREIGN PATENT DOCUMENTS

| | | |
|---|---|---|
| DE | 102012024400 A1 | 6/2014 |
| EP | 1000796 A2 | 5/2000 |
| WO | WO 2010045993 A1 | 4/2010 |
| WO | WO 2014090355 A2 | 6/2014 |

* cited by examiner

COMPRESSOR FOR GENERATING COMPRESSED AIR, COMPRESSED AIR SUPPLY SYSTEM, PNEUMATIC SYSTEM, AND METHOD FOR OPERATING A COMPRESSOR

CROSS REFERENCE TO RELATED APPLICATIONS

This application is a U.S. National Stage Application under 35 U.S.C. § 371 of International Application No. PCT/EP2016/000824 filed on May 18, 2016, and claims benefit to German Patent Application Nos. DE 10 2015 006 711.7 filed on May 29, 2015. The International Application was published in German on Dec. 8, 2016 as WO 2016/192837 A1 under PCT Article 21(2).

FIELD

The invention relates to compressors and further relates to compressed air supply systems, pneumatic systems, and method for operating compressors.

BACKGROUND

Compressors for generating compressed air, in particular for a compressed air supply system of a vehicle, have proven successful for numerous applications. A compressor comprises an electric motor in the form of a brushed direct current electric motor and a compressor that can be driven by way of the electric motor. The brushed direct current electric motor (BDC motor) described in this case has for the most varied reasons proven more successful than a brushless direct current motor (BLDC motor), in particular in the case of the previously mentioned application in a compressed air supply system in a vehicle.

A BLDC motor is a construction of a direct current motor in which the mechanical commutator that is provided in the case of brushed direct current electric motors and comprises brushes for applying current is replaced by an electric circuit. BLDC motors are suitable for driving comparatively low-load machines, such as fans, drives in disk drives, compressors, video recorders or model planes and the like, but they are encumbered with various disadvantages in the case of automotive applications where the load requirements are higher, in particular a brushed direct current motor has proven itself fundamentally to be the more favorable variant at least in the case of applications where the requirements are greater with respect to reliability and load tolerance.

On the other hand, owing to its high power consumption, a compressor that is usually controlled by way of a compressor relay and driven by means of a direct current brush motor is encumbered by various disadvantages during the switching-on and switching-off procedures and possibly also during operation under different load conditions.

In order to eliminate such disadvantages at least to some extent, an electric motor for driving a compressor of an air supply unit in a motor vehicle is provided by way of example in WO 2010/045993, wherein the electric motor comprises at least one semiconductor switch for controlling the electric motor. The semiconductor switch and thus the electric motor are controlled by a control unit having a pulse-width modulated voltage. It is possible to control the rotational speed of the electric motor by way of the pulse-pause ratio of this voltage. As a consequence, a soft start-up of the electric motor is possible. A sensor output of the semiconductor switch is connected by way of a measuring line to a control unit. The sensor output is used to output a current signal that is proportional to the current that is flowing through the semiconductor switch and thus through the electric motor. The rotational speed of the electric motor and the pressure generated by the compressor are determined in the control unit with reference to the current signal. In this case, a semiconductor switch is integrated in a brush bridge of the electric motor.

Such a solution has fundamentally already proven itself at least as advantageous in comparison to soft start-up circuits that are based on thyristors, even if these are constructed in a comparatively complex manner, by way of example with a timing element on the basis of a control transistor, as disclosed in DE 2,758,309 C2 for a universal motor.

Nevertheless, the operation of a compressor for generating compressed air can still be improved, in particular with respect to the delimitation of the operating current of the electric motor, in particular beyond the fundamentally positive approach of WO 2010/045993 A1.

An improved concept for operating an electric motor in the form of a brushed direct current electric motor for a compressor for generating compressed air is described in DE 10 2012 024 400 A1. The electric motor is controlled by means of an electronic control module of a control unit for delimiting an operating current of the electric motor, wherein the electronic control module comprises a control component and an executable program module and is configured so as to specify in a variable manner with respect to time a threshold current that delimits the operating current.

The preferred option for an operational control of the brushed direct current electric motor is fundamentally the option of specifying a threshold current in combination with a switching-on or switching-off procedure of the electric motor. The ramps of the electric motor can fundamentally be specified in a variable or fixed manner by way of a corresponding PWM curve.

However, in addition, it has been shown that such an approach can limit the dynamics of the compressor characteristics depending upon the environmental conditions. In addition, it has been shown that this approach that in itself is advantageous does nevertheless in a non-changeable manner cause a power dissipation in the control circuit or in a control unit in said circuit—in particular in a current delimiting element, in particular in a free-running current path—, said power dissipation being specified by the fixed or dynamic control of the operating ramps of the threshold currents.

SUMMARY

In an embodiment, the present invention provides a compressor system for generating compressed air for a compressed air supply system in a vehicle. The compressor system includes a brushed direct current electric motor (BDC electric motor); a compressor configured to be driven by the BDC electric motor; and a control unit for controlling the BDC electric motor and allocated to the BDC electric motor so as to delimit an operating current of the electric motor. A free-running current path is allocated to the control unit, the free-running current path being configured to delimit the operating current of the electric motor in a variable manner. A switch controller is allocated to the control unit, the switch controller being configured to specify a switched-on time period (t_ON) and/or a switched-off time period (t_OFF) for the electric motor in a variable manner.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
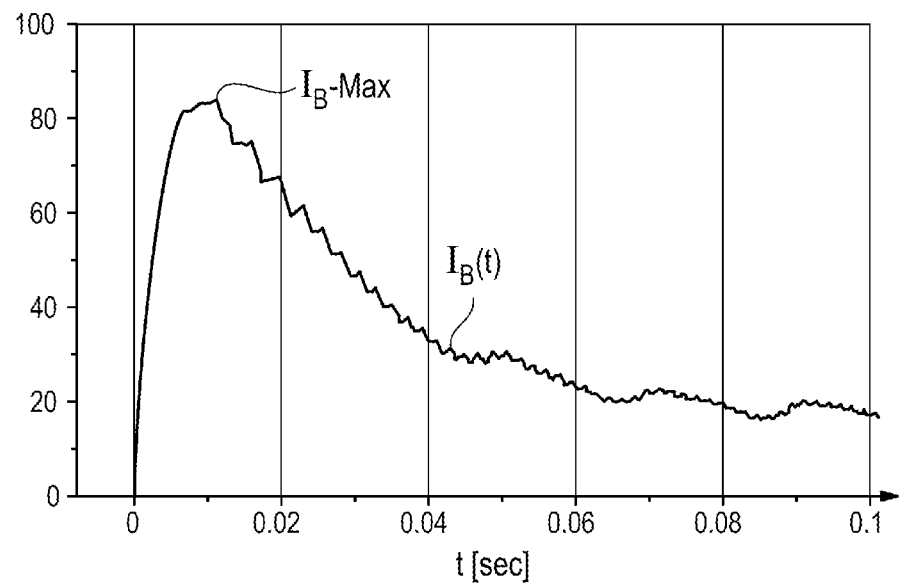
FIG. 1 illustrates an exemplary curve of a start-up current for explaining a start-up current characteristic without a current delimitation as a function of time for an operating current of an electric motor, which is configured in the form of a brushed direct current electric motor, during the operation of a compressor of a compressor for generating compressed air for a compressed air supply system in a vehicle.

It is desirable in the case of a compressor for generating compressed air, in particular for a compressed air supply system of a vehicle, to avoid the mentioned operating disadvantages. In particular, it is desirable to maintain the limitations of the dynamics of the compressor as small as possible and at the same time to maintain the energy dissipation in the control circuit or in a control unit in said circuit—in particular in a current delimiting element, in particular in a free-running current path—by means of the switching-on and switching-off characteristics. It is also desirable to configure the compressor in a comparatively simple and consequently cost-effective manner with respect to the manner in which it is controlled.

It follows from this that an aspect of the invention is to provide a device and a method—in particular for supplying compressed air in a vehicle—wherein the controller that is provided by means of an electronic control unit for delimiting an operating current of the electric motor is improved. In particular, the controller generally is to be configured so as to improve the manner in which the compressor operates, preferably so as to achieve a soft start-up, a switching-off operation and/or a normal operation. It is preferred that, in particular in the case of a normal operation, it is possible to control the rotational speed of the compressor.

According to an embodiment of the invention, a compressor for generating compressed air, in particular for a compressed air supply system of a vehicle, includes an electric motor in the form of a brushed direct current electric motor (BDC electric motor), a compressor that can be driven by way of the electric motor, wherein a control unit for controlling the electric motor is allocated to the electric motor so as to delimit an operating current of the electric motor.

According to embodiments of the invention, the electric motor is controlled by a control unit for delimiting an operating current of the electric motor. The electric motor is fundamentally preferably in the form of a brushed direct current electric motor. This has proven in particular to be advantageous for a compressed air supply system in a vehicle; namely in particular when using the compressor for generating compressed air in a compressed air supply line of the compressed air support system According to embodiments of the invention, a brushed direct current electric motor (BDC-motor) can be used while avoiding the disadvantages that are associated with a relay operation, such as are described in WO 2010/045993 A1.

According to an embodiment of the invention, the control unit is allocated an electric current delimiting element—in particular in a free-running current path—that is configured so as to delimit the operating current (IB) in a variable manner, wherein the control unit is allocated a switch controller that is configured so as to specify a switched-on time period (t_ON) and/or a switched-off time period (t_OFF) for the electric motor in a variable manner. In particular, it is possible to generate a control procedure that comprises in a similar manner to a PWM control procedure a switched-on time period (t_ON) and/or a switched-off time period (t_OFF) but in contrast to a PWM control procedure said control procedure specifies the switched-on time period (t_ON) and/or the switched-off time period (t_OFF) in a variable manner.

It is to be noted in this respect that from the technical point of view although the control unit delimits in particular the current, the current delimiting element is nevertheless referred to at this point and also hereinunder, in particular in a free-running current path, as such a unit.

A control unit for controlling the electric motor is allocated to the electric motor so as to delimit an operating current of the electric motor. In other words, for example, it is not merely a time-dependent operating current delimiter that is provided for the transient operation of the brushed direct current electric motor.

It is provided in accordance with an embodiment of the invention that the control unit is allocated an electric current delimiting element, in particular in a free-running current path—, by means of which the operating current (IB) is delimited in a variable manner, the control unit (900, 900') is allocated a switch controller (901) by means of which a switched-on time period (t_ON) and/or a switched-off time period (t_OFF) are specified for the electric motor (500) in a variable manner. This is preferably used for a switching-on ramp and/or a switching-off ramp.

The invention has recognized that it is possible using an electric current delimiting element—in particular in a free-running current path—to delimit the amplitudes and ramps of an operating current or of an operating voltage of the electric motor for the control element. The current delimiting element is advantageous in order to prevent the control unit being overloaded or damaged. It has been shown that in particular a switching-off energy could be too high if a current delimiting element, in particular a free-running current circuit, were not provided in particular in a free-running current path. The invention moreover provides in an advantageous manner for the fact that the time period of the free-running current (t_OFF) can be controlled in such a manner that the energy that is to be absorbed is reduced in the electric current delimiting element—in particular in a free-running current path—in particular in a free-running circuit so that the component is prevented from becoming damaged. This can fundamentally be achieved in addition or where appropriate also as an alternative to delimiting an operating current in a manner specified by an electronic control module.

A control unit in accordance with the concept of the invention is consequently allocated a switch controller by means of which it is possible to specify a switched-on time period in a variable manner. The control unit can in an advantageous manner specify the operating current with respect to the amplitude and/or ramp in a variable manner by means of the switched-on time period, in particular during the start-up procedure of the electric motor.

Furthermore, the invention has recognized that it is possible in an advantageous manner to maintain the energy dissipation at a small value by means of the additionally or alternatively specified switched-off time period by way of the current delimiting element—in particular in a free-running current path. As a consequence, the dynamics of the electric motor for operating the compressor are limited to a comparatively small extent by means of the control unit and on the other hand the energy dissipation is maintained at a small value.

Overall, the concept of the invention in the combination of the control unit and the switch controller provides a solution to the conflict of in principle opposing interests; namely on the one hand to maintain the operating currents and their ramps at a small value in particular with regard to the start-up behavior and on the other hand to provide comparatively cost-effective components that are nevertheless not to be loaded with excessively high energy dissipation or are not be overloaded. The concept of the invention provides with the specified switched-off time periods a controlled and consequently consolidated loading of the current delimiting elements—in particular in a free-running current path.

Overall, the concept of the invention is thus relying on the purposeful and appropriate configuration or control of the switched-on and switched-off time periods. Limitation of the dynamics of the compressor and excessive energy dissipation caused by excessively rigidly PWM-controlled operating current controls are thus counteracted. It is possible to configure the current delimiting element or elements—in particular in a free-running current path—appropriately with respect to the specific application whilst avoiding over-dimensioning said elements.

A further development provides that the switched-off time period d(t_OFF) for the electric motor is specified in such a manner that the energy dissipation, in particular heat absorption, of the current delimiting element—in particular in a free-running path—is sufficiently delimited.

The electric current delimiting element comprises, advantageously in a separate electric path,—in particular in a free-running current path—preferably a free-wheeling diode (D) and a power transistor (FET), in particular a MOSFET having an integrated free-wheeling diode. The transistor has proven to be particularly advantageous in order to switch off the current delimiting element, in particular in a free-running current path, in the event of a reversed polarity and consequently to protect the diode.

Figure 5:
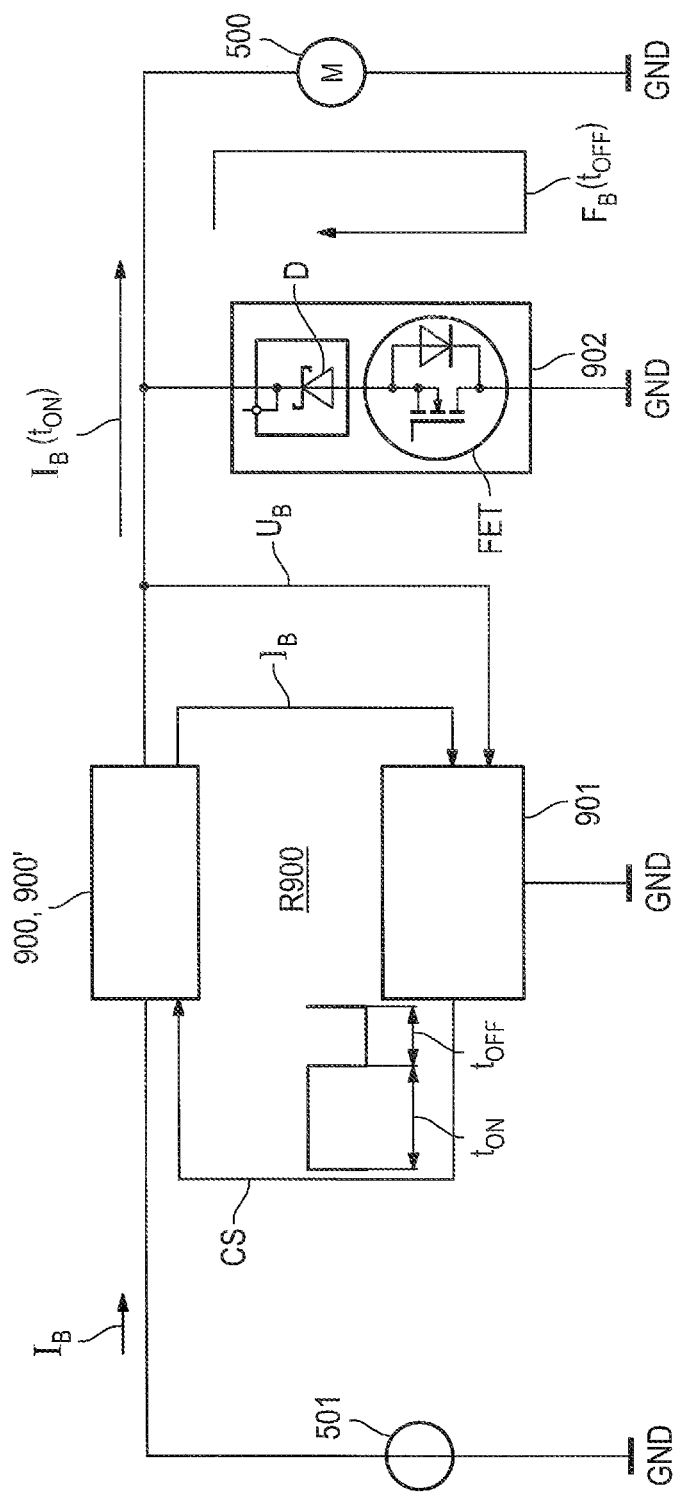
FIG. 5 illustrates a circuit diagram for an open-loop control unit 900 that is coupled to a switch controller 901 within the scope of an open-loop and closed-loop control circuit and that as a result of the open-loop control unit 900 is configured so as fundamentally to specify in a variable manner amplitudes and ramps of the operating current for the electric motor and in addition as a result of the switch controller 901 said switch controller is configured so as on the one hand to safeguard this specification, in combination with the free-running current path, and on the other hand to maintain the energy dissipation at a small value in the free-running current path.

It is advantageous that a current delimiting element—in particular in a free-running current path—comprises essentially a power transistor and a free-wheeling diode or is embodied from the said power transistor and free-wheeling. These can be formed by way of example as power transistors having a free-wheeling diode connected in series. A substrate diode that is oriented opposite to the free-wheeling diode and where appropriate is connected in addition in parallel in the power transistor thus prevents a switching-off procedure in the event of a reversed polarity. These can also be formed as illustrated in FIG. 5. In the case of an operating current of a realistic 100 amps that are to be delimited, a power transistor that has a resistance of 3 mΩ is suitable in order to limit the power dissipation to below 100 watt and on the other hand to maintain the temperature of the components below 100° C. for the entire component; the power transistor in combination with the free-wheeling diode has proven to be advantageous in order to protect said components against reverse voltage.

It is thus possible with respect to the interruption of the operation mentioned below in accordance with the switched-on time period (t_ON) and/or the switched-off time period (t_OFF) for the electric motor to interrupt the operating energy in a variable manner by means of the switch controller that is allocated to the control unit.

With respect to the method, the switched-on time period (t_ON) and/or the switched-off time period (t_OFF) for the electric motor is advantageously specified by means of the switch controller in a variable manner and dependent upon an operating current and/or an operating voltage for the electric motor (500).

For this purpose, it is possible in an advantageous manner relating to the compressor to couple the control unit and the switch controller within the scope of a closed-loop and/or open-loop control circuit.

The closed-loop and/or open-loop control circuit is embodied from the control unit and the switch controller so as to receive an operating current and/or an operating voltage for the electric motor in the switch controller, in particular from the control unit and/or the electric motor, and so as to output the switched-on time period (t_ON) and/or the switched-off time period (t_OFF), preferably by means of a control signal, from the switch controller, in particular to the control unit and/or the electric motor.

It is preferred, preferably by means of the switch controller, that the switched-on time period (t_ON) and/or the switched-off time period (t_OFF) for the electric motor are specified dependent upon an operating current and/or on an operating voltage, in a variable manner directly to the electric motor, and/or initially in a variable manner to the control unit, preferably modified by way of the control unit, in particular to the electric motor.

For this purpose, it is possible in an advantageous manner relating to the compressor for the electric current delimiting element—in particular in a free-running current path—to be connected in parallel to the electric motor, while outputting an ACTUAL value of the operating current and/or an operating voltage to the control unit and/or to the switch controller and/or while receiving an operating current and/or an operating voltage in accordance with a DESIRED value of the control unit in accordance with a control signal from the switch controller to the control unit and/or the electric motor (500).

The switch controller can preferably be configured so as to specify the switched-on time period (t_ON) and/or the switched-off time period (t_OFF) in a variable but fixed manner, or in a variable manner that can be dynamically varied.

In particular, it is possible preferably by means of the switch controller: to specify the switched-off time period (t_OFF) in a variable but fixed manner with reducing values, namely with an increasing operating time of the electric motor and/or for an increasing operating current/operating voltage for the electric motor, and/or to specify the switched-on time period (t_ON) in a variable but fixed manner with increasing values, namely with an increasing operating time of the electric motor and/or for reducing values of the operating current and/or operating voltage for the electric motor (500), preferably directly after the start of operation of the electric motor (500).

In general, it is proven itself to be advantageous that the switch controller (901) is embodied so as: to maintain the operating current for the electric motor (500) to a value below a maximum start-current of I_max=30 A and/or to maintain a gradient of the operating current for the electric motor (500) to a value below a maximum limit gradient of the current of G_max=300 A/s.

In general, it has proven itself to be advantageous that the switch controller is embodied so as to: to maintain a relative temperature increase in the electric current delimiting element—in particular in a free-running current path—to a value below 40° C., in particular to below 35° C., in particular to below 20° C., and/or to maintain an absolute temperature to a value below 140° C., in particular to below 130° C., and/or a junction temperature in the current delimiting element—in particular in a free-running current path—to below 180° C., in particular to below 170° C.

In general, it has proven itself to be advantageous that the switch controller is embodied so as to maintain the switched-on time period (t_ON) and/or the switched-off time period (t_OFF) to below 1000 µs, in particular to below 800 µs, below 600 µs, below 400 µs and/or below 200 µs.

In particular, in accordance with a further development, the switched-on time period (t_ON) for the electric motor is specified in such a manner that the operating current is delimited.

Furthermore, the present invention recognizes that the electronic control module—being in particular suitable for a soft start-up, also described as a CSS controller (CSS compressor soft start)—can still be improved. It is preferred that the electronic control module (CSS control module) comprises a control component, such as a micro-controller or the like, having a component that is provided with logic, and an executable program module.

The control unit comprises advantageously an electronic control module, wherein by means of the electronic control module (910) of the control unit the electric motor can be controlled so as to delimit an operating current (IB) of the electric motor, wherein the electronic control module comprises a control component and an executable program module, wherein the electronic control module is embodied so as to delimit the operating current in a variable manner with respect to time.

Thus, the electronic control module can be configured by way of example so as to specify in a variable manner with respect to time a threshold current (IS) that delimits the operating current.

It is consequently possible in an advantageous manner to specify in a variable manner by means of the switched-on time period an operating current delimiting procedure as a function of time, in particular it is at least possible to specify a first and a second threshold current that are different from one another. By virtue of building on this principle, it is possible not only to specify a maximum threshold value but rather in addition also to specify a gradient for the operating current—by way of specifying in a variable manner with respect to time threshold currents that delimit the operating current.

According to embodiments of the invention, it is possible, while maintaining the superiority and the advantages of the brushed direct current electric motor (BDC motor) to delimit the motor in an improved manner with respect to the operating current. It is not only an absolute delimitation that is possible but it is also possible to delimit a gradient of the operating current.

In relation to the electronic control module, reference is expressly made to DE 102012 024 400 A1, the content of which is fully incorporated into the present application documents by virtue of being quoted.

An embodiment of the invention that is described with the aid the drawing provides that a compressor relay is replaced by means of a semiconductor switch that is controlled by means of a micro-controller. By way of a program module that is stored in the micro-controller, the permissible current consumption of the compressor is delimited in the case of a switch-on demand of the compressor. The permissible current in the case of a switch-on demand can be varied with respect to time in such a manner that both the start-up current peak and also the start-up current gradient (di/dt) are influenced. This occurs by means of rapidly controlling the semiconductor switch.

By way of a program module that is stored in the micro-controller, the permissible switch-off current gradient of the compressor can be delimited in the case of a switch-off demand of the compressor. This can also be implemented by means of rapidly controlling the semiconductor switch.

It is possible even after the end of the switching-on procedure (in other words with the compressor running) by way of a program module that is stored in the micro-controller to control the current consumption of the compressor by means of a PWM control procedure, which has a variable pulse-pause ratio or a variable frequency in such a manner that: the load-dependent, in particular pressure-dependent changes in the rotational speed can be minimized.

It is possible on the basis of the concept to configure a control module so as to specify in a variable manner with respect to time a threshold current that delimits the operating current. With the scope of a particularly preferred further development, the program module is configured so as to specify at least one threshold current limit function of the threshold current as a function of time in order to delimit the operating current. As a consequence, it is particularly easily possible to maintain the operating current in a precise purposeful manner below an envelope; the envelope is advantageously essentially specified by the threshold current limit function. The further development has recognized that it is consequently possible in general to operate the electric motor in a further improved manner, in particular in order to delimit an operating energy supply such as an operating current and/or an operating voltage.

In particular, it is provided in a further development that the control component is configured so as to interrupt the operation—in particular the operating energy supply, in other words in particular an operating current and/or an operating voltage—of the electric motor, in particular to interrupt said operation repeatedly for short periods of time. It is particularly preferred that an operating voltage of the electric motor can be interrupted for this purpose. The operation is interrupted—in particular the operating energy supply, in other words an operating current and/or an operating voltage—preferably for the case that the operating current achieves, in particular exceeds or is below the threshold current of the at least one threshold current limit function. By way of example, a permissible operating current of the electric motor for operating the compressor from a start value until an end value in accordance with a specific function of time can be increased or reduced.

It is possible in an advantageous manner to influence in a purposeful manner a start-up current peak and/or a phase length of an allocated start-up and/or switched-off time section and/or a start-up current gradient; this also applies in addition to or as an alternative to a switched-off current peak and a switched-off current gradient. It is in particular possible in a further development that the ability of the compressor to start-up and/or switch off despite the operating current delimitation is not reduced or not significantly reduced. This relates essentially to the fact that a threshold current that delimits the operating current is specified in a variable manner with respect to time. With respect to an improved switch-off behavior, it is possible to achieve in particular that the compressor runs down in an acoustically inconspicuous manner.

FIG. 1 illustrates with regard to the introduction a characteristic start-up current characteristic without a current delimitation with a comparatively high current level IB-Max at approx. 80 amps that can possibly have a disadvantageous influence on the air supply system, in particular on other components of a compressed air supply, or in general on other vehicle systems. A compressor that is usually controlled by way of a compressor relay and driven by means of a direct current brush motor can be encumbered by various disadvantages as a result of its power consumption during the switching-on and switching-off procedures and possibly also during operation under different load conditions.

These can inter alia also influence the vehicle electrical system and a safety configuration of the compressed air supply circuit. Even an unacceptable voltage drop across the compressor-supply lines at the start-up moment can occur as a result of the power consumption and consequently influence the start-up ability of the compressor. In addition, an exemplary start-up current characteristic is illustrated in FIG. 1 of the drawing. Electrically driven compressors for air suspension systems in passenger cars by way of example have in general a power consumption of 180 W to 400 W in the case of a start-up current at a current level of IB-Max from up to 120 A. In the case of a high start-up current, as illustrated in FIG. 1, a greater voltage drop occurs that reduces the start-up ability of the compressor. In order to compensate for this, it is therefore usually necessary to reserve corresponding power cross-sections for the compressor supply. In addition, a safety configuration must be able to withstand the start-up current of the compressor without triggering a malfunction. However, it is to be understood in particular with respect to the influences on the vehicle electrical system that in the case of a partly-charged starter battery the generator can usually not control the steep current increase during the switching on of the compressor by means of the relay. As a consequence, the vehicle temporarily experiences an under-voltage which in turn can lead to malfunctions in other systems. It has already proven itself in this case to be advantageous to ventilate the distributing arrangement prior to switching off the compressor so as to reduce the operating current of the compressor.

If a brushed direct current electric motor for driving a compressor by way of a relay is in contrast switched off, a sudden reduction in the current demand of by way of example approx. 25 to 30 A in the case of a partly-charged battery causes an undesired influence on the vehicle electrical system, which can quite probably lead to a temporary overvoltage that in the worst case scenario actually causes malfunctions in other systems.

In addition to this, in the case of an in particular two-stage compressor, the load rotational speed characteristic of said compressor is dependent upon the rotational speed and compressor counter pressure. Changes in the rotational speed when the compressor is running can lead to acoustic abnormalities. In particular in comparison to a single-stage compressor, the dependency in the relevant pressure range of the two-stage compressor—with a first and a second compressor stage—upon the rotational speed is even more significantly pronounced. Although this is also fundamentally available in the case of a single-stage compressor, it is not as significant as in the case of a two-stage compressor, consequently in particular in the case of a two-stage compressor a preferred application of controlling the rotational speed is provided, as described hereinunder.

Figure 2:
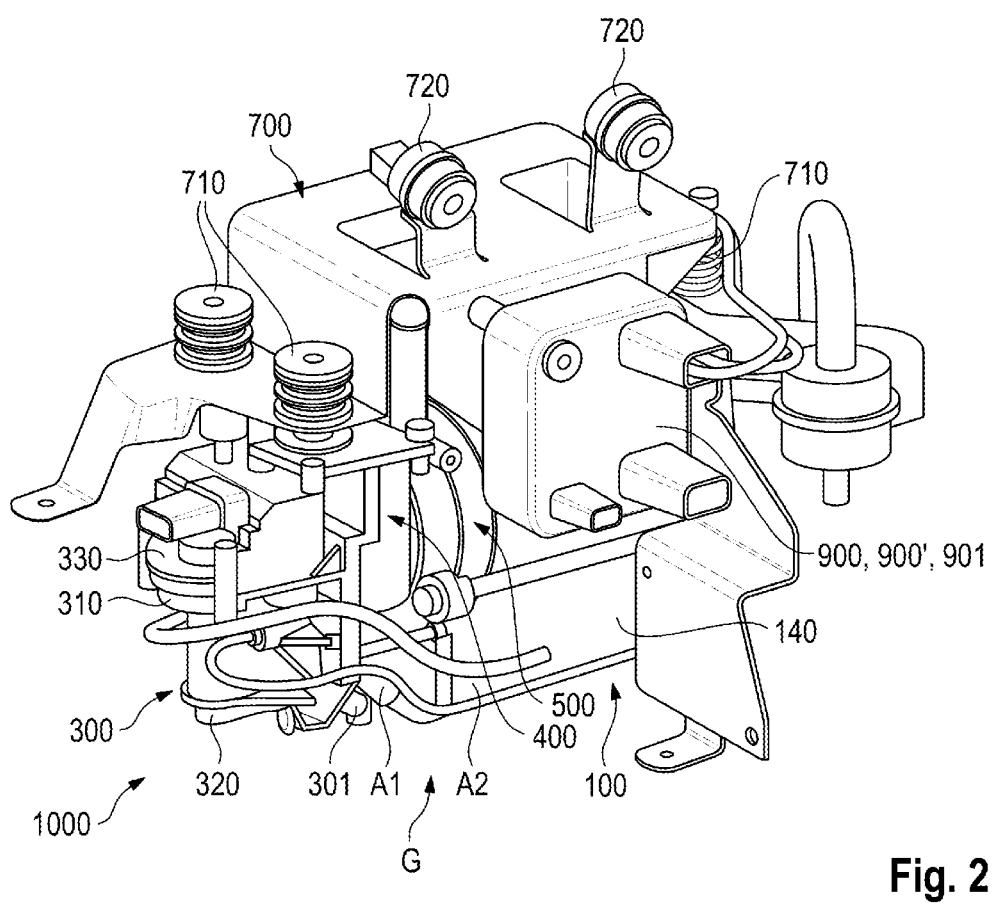
FIG. 2 illustrates a perspective view of a particularly preferred construction of the compressed air supply system as is further illustrated in FIG. 3.

In order to eliminate the previously explained abnormalities or problems, the compressor is activated and deactivated by way of an electronic open-loop control unit 900 for implementing at least a soft start-up (CSS—compressor soft start). An electronic system of this type is installed in the direct vicinity of the compressor and is illustrated in FIG. 2 in an exemplary manner together with a compressed air supply system. Initially with reference to FIG. 2, this illustrates in a perspective view (A) a compressed air supply system 1000 that in the present case is configured so as to supply a pneumatic system 1001 in the form of an air suspension system of a passenger car (not illustrated)—the pneumatic system 1001 (not illustrated) is further explained with the aid of a circuit diagram in FIG. 3. Initially with reference to FIG. 2,—in part already in FIG. 3—the compressed air supply system 1000 comprises an electric motor 500 for driving a compressor 400, wherein the compressor 400 is configured in this case as a double compressor. Air that is to be compressed is supplied to the compressor 400 and then transmitted compressed to a pneumatic main line 200 as compressed air. An air dryer 100 is likewise connected to the pneumatic main line 200, said air dryer having a dryer container 140 that is used to dry the compressed air in a dryer bed that is formed directly in chambers in the dryer container 140.

The pneumatic main line 200 connects by way of a further pneumatic line 600 in total a compressed air supply line 1 from the compressor 400 to a compressed air connection 2 to a distributing arrangement 610 of the pneumatic system 1001. A valve arrangement 300 that is evident in FIG. 2 downstream of its housing is also connected in a pneumatic manner in the pneumatic main line 200. The valve arrangement 300 comprises in this case a switchable directional control valve 310 that can be switched by way of a control valve 320 in the form of a solenoid valve. It is also integrated as a booster valve 330 in the valve arrangement 300. The booster valve 330 (in this case a 2/2 booster valve) and the control valve 320 in the form of a solenoid valve (in this case a 3/2 solenoid directional control valve) are configured in this case as a double block, in other words as a double valve. The double valve is integrated in this case at the directional control valve arrangement 310 in the valve arrangement 300.

Overall, the compressed air supply system 1000 is configured with an electric motor 500 and a two-stage compressor 400 that can be assembled in a modular manner in a component having the air dryer 100 and the valve arrangement 300 and also the pneumatic main line 200. As is evident in detail in FIG. 2, a housing arrangement G having the electric motor 500 and the compressor 400 are provided, wherein the compressor 400 is used as a central mono-block. In particular, the compressor 400 in this case is configured in a particularly advantageous manner as a two-stage compressor. The air dryer 100 and the valve arrangement 300 can be attached to this housing arrangement G on opposite-lying sides. In particular, the air dryer 100 and the valve arrangement 300 can be attached in a replaceable manner to the housing arrangement G. The housing arrangement G that is evident in FIG. 2 is configured on the one hand with the electric motor 500, the compressor 400 and the air dryer 100 in an approx. U-shaped manner. The valve arrangement 300 is attached at the base of the U-shaped arrangement. The housing arrangement G comprises a connection plane A1 that is facing the valve arrangement 300 and it is possible to attach the valve arrangement 300 to said connection plane in a modular manner. The housing arrangement G comprises a connection face A2 that is facing the air dryer arrangement 100 and it is possible to attach the air dryer arrangement 100 to said connection face in a modular manner. The connection plane A1 and the connection face A2 are spaced apart from one another by way of a connection spacing, wherein the mono-block of the compressor 400 is mainly accommodated in the connection spacing. As a result of the modular arrangement of the previously mentioned components of the air dryer 100 and of the valve arrangement 300, the functionalities of the dryer function on the one hand and of the compressed air control function on the other hand are spatially separate. The functionalities can be configured individually as required and where necessary replaced and separately changed by means of replacements.

FIG. 2 illustrates a view of an exemplary construction of the compressed air supply system 1000 in a mounting 700 that can also be referred to as a bracket. The mounting 700 supports the electronic control unit 900, 900' that is configured so as to specify the threshold current IS that delimits the operating current IB for the electric motor 500 in a variable manner with respect to time. The control unit 900, 900' is allocated a switch controller 901 that is configured so as to specify a switched-on time period (t_ON) and/or a switched-off time period (t_OFF) for the electric motor (500) in a variable manner. Moreover, the mounting 700 comprises a system of spring bearings 710 for supporting the compressed air supply system 1000 and likewise sprung fastening connections 720 for attaching the mounting 700 to a component of a vehicle.

Figure 3:
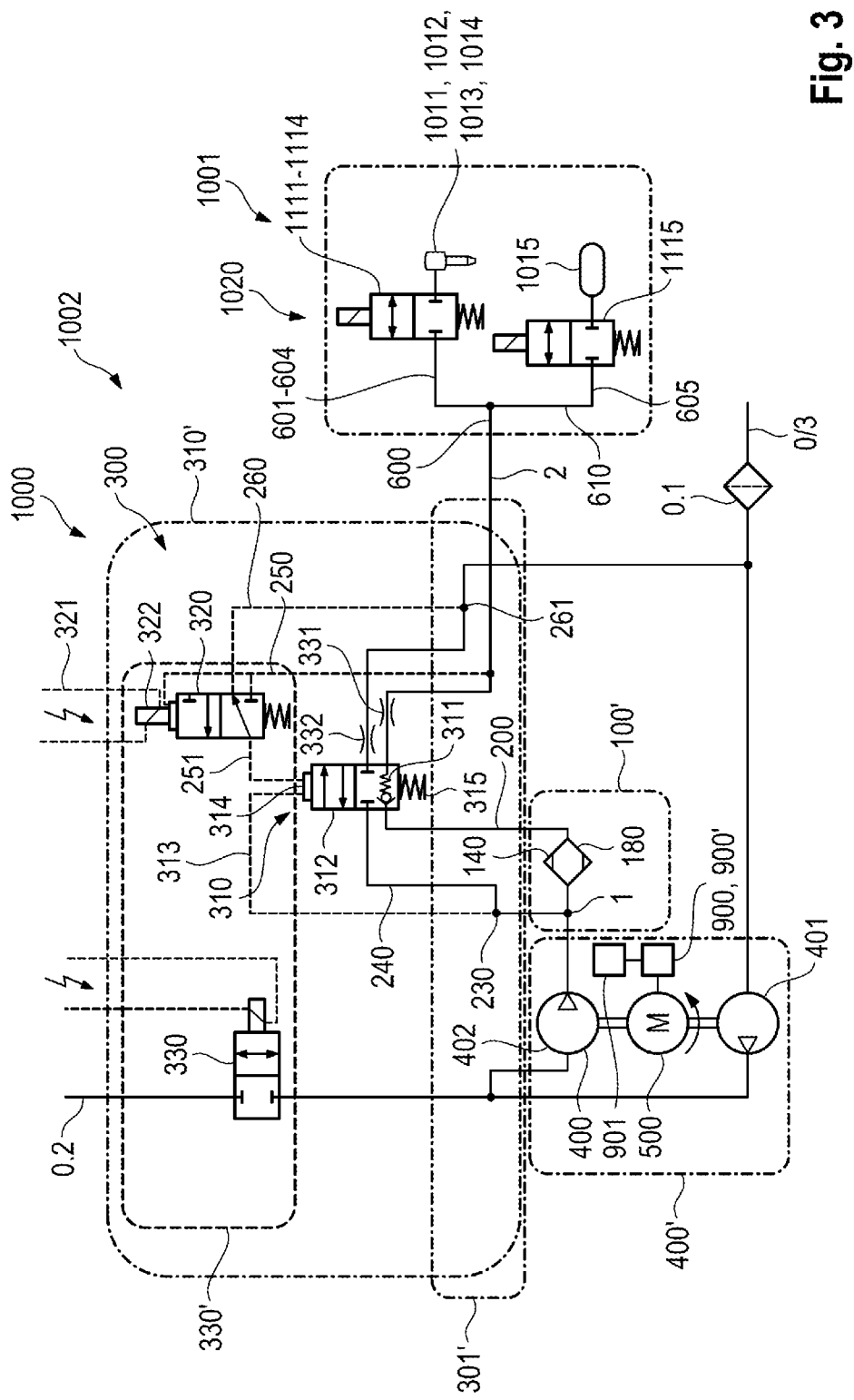
FIG. 3 illustrates a circuit diagram of a particularly preferred pneumatic system having a compressed air supply system that comprises a compressed air supply line having a compressor for generating compressed air with an electric motor in the form of the brushed direct current electric motor and said compressed air supply system in this embodiment further comprises a two-stage compressor.

FIG. 3 illustrates a pneumatic circuit diagram of a pneumatic compressed air supply system 1002 having the compressed air supply system 1000 of the previously described type and a pneumatic system 1001 in the form of an air suspension system. The circuit diagram of the compressed air supply system 1000 also includes the compressor 400' in a housing module—in this case the mentioned mounting 700 as a part of the housing arrangement G—together with the electric motor 500, the compressor 400 and the open-loop control unit 900. The control unit 900, 900' is allocated a switch controller 901 that is configured so as to specify a switched-on time period (t_ON) and/or a switched-off time period (t_OFF) for the electric motor (500) in a variable manner. Also included in the illustration are the dryer module 100' (of the air dryer 100), the booster valve housing module 330' (with the booster valve 330, and in this case also with the discharge valve in the form of the control valve 320) and an air-distributing module 301' —for example in the form of a flange 301 on a valve housing module 310' of the directional control valve arrangement 310, in other words the directional control valve arrangement 310 that can be switched by way of a control valve 320 in the form of a solenoid valve. The valve arrangement 300 that is being used as a control unit can be assembled and connected in a modular manner in a comparatively simple manner by way of the said flange 301 to the other modular units of the compressed air supply system 1000.

The compressed air supply system 1000 is used to operate the pneumatic system 1001. In addition, the compressed air supply system 1000 comprises a previously mentioned compressed air supply line 1 and a compressed air connection 2 to the pneumatic system 1001. The compressed air supply line 1 is in this case configured with an air supply line 0, a filter element 0.1 that is arranged upstream of the air supply line 0, and a compressor 400 that is arranged downstream of the air supply line 0 and driven by way of the electric motor 500—in this case a double air compressor having a first compressor stage 401 and a second compressor stage 402— and also a connection of the compressed air supply line 1, wherein the air dryer 100 having the dryer container 140 is connected to said connection in the pneumatic main line 200.

It is possible to provide only one chamber but also multiple chambers of the air dryer 100; for example a first and second chamber of the air dryer 100 for forming a first air dryer stage and a second air dryer stage can be provided connected in series in the pneumatic main line 200. In the present case, the air supply line 0 and a filter element 0.1 that is arranged upstream of said air supply line are assembled with a ventilation connection 3.

In accordance with the embodiment illustrated in FIG. 3, a branch line 230 branches at the compressed air supply line 1 from the pneumatic main line 200 and leads to a ventilation line 240 to a ventilation connection 3 and the filter element 0.1 that is connected downstream. The pneumatic main line 200 is the single pneumatic line of the first pneumatic connection that continues as far as the pneumatic system 1001 with a further pneumatic line 600. The pneumatic main line 200 connects the compressed air supply line 1 and the compressed air connection 2, wherein an unlockable non-return valve 311 and a first restrictor 331 are arranged in the pneumatic main line 200 of the air dryer 100 and further in the direction of the compressed air connection 2. The first restrictor 331 is arranged between the pneumatically unlockable non-return valve 311 and the compressed air connection 2. A controllable ventilation valve 312 is arranged as part of the directional control valve arrangement 310—in addition to the unlockable non-return valve 311—connected in series with a second restrictor 332 in the ventilation line 240. The series arrangement comprising a first restrictor 331 and pneumatically unlockable non-return valve 311 is arranged between the air dryer 100 and the compressed air connection 2 to the pneumatic system 1001 in the pneumatic main line 200. The nominal size of the second restrictor 332 lies above the nominal size of the first restrictor 331.

Furthermore, the compressed air supply system 1000 comprises the previously mentioned second pneumatic connection—namely the previously mentioned ventilation line 240—that is pneumatically connected to the pneumatic main line 200 and the ventilation connection 3 and the filter element 0.1 and/or the sound absorber.

The ventilation valve 312 is in this case configured as a directional control valve that is separate from the pneumatically unlockable non-return valve 311 and is arranged in the second pneumatic connection that is formed by the ventilation line 240. The controllable ventilation valve 312 is, as an indirectly connected relay valve, part of a valve arrangement 300 having a previously mentioned control valve 320 in the form of a 3/2 directional control solenoid valve. The control valve 320 can be controlled by means of a control signal that can be transmitted by way of a control line 321 in the form of a voltage signal and/or current signal to the coil 322 of the control valve 320. During the control procedure, the control valve 320 can be moved from the non-energized position illustrated in FIG. 3 into a pneumatically open energized position; in this position, a control pressure is transmitted by way of a pneumatic control line 250 from the pneumatic main line 200 to the pneumatic controller of the controllable ventilation valve 312 as a relay valve. In the non-energized position, the pneumatic main line 200 is closed by the unlockable non-return valve 311. The controllable ventilation valve 312 is in this case provided in addition with a pressure delimiter 313. The pressure delimiter 313 taps a pressure by way of a pneumatic control line upstream of the ventilation valve 312—specifically between the branch line 230 and ventilation line 312—, which in the case of a threshold pressure being exceeded raises the piston 314 of the ventilation valve 312 from the valve seat against the force of an adjustable spring 315—in other words moves the controllable ventilation valve 312 also without a controlling procedure by way of the control valve 320 into the open position. In this manner, it is avoided that an undesired excessively high pressure occurs in the pneumatic system 1000.

In the present closed state, the control valve 320 separates the control line 250 and is pneumatically connected by way of a further ventilation line 260 having the ventilation line 240 to the ventilation connection 3. In other words, a line section 251 of the control line 250 is connected to a further ventilation line 260 between the control valve 320 and the ventilation connection 3 when the control valve 320 is in the closed position as illustrated in FIG. 3, said line section lying between the directional control valve arrangement 310—in particular a ventilation valve 312—and the control valve 320. In addition, the further ventilation line 260 connects in the further branch connection 261 to the further ventilation line 240. The branch line 230 and the further ventilation line 240 leads by way of the branch connection 261 to the ventilation connection 3.

It is possible by way of the control valve 320, when a control pressure is present at the compressed air connection 2—in particular a control pressure that is derived from the pneumatic main line 200 or from the further pneumatic line 600 by way of the pneumatic control line 250—to open the ventilation valve 312 under the influence of pressure from the piston 314. The procedure of moving the control valve 320 into the open state does not only lead to the ventilation valve 312 opening but rather also unlocks the unlockable non-return valve 311. In other words, the control valve 320 of the solenoid valve arrangement 300 is used to control the ventilation valve 312 that is provided separately from the non-return valve 311 and also to control the non-return valve 311. This leads to the air dryer 100 being opened pneumatically on both sides when the control valve 320 is moved into the open position. Furthermore, this operating position that can be assumed by the compressed air supply system 1000 can be used during the operation to ventilate the pneumatic system 1001 and simultaneously to regenerate the air dryer 100. The operating position, illustrated in FIG. 3, of the compressed air supply system 1000 is used in the case of the through-flow of the non-return valve 311 in the through-flow direction in particular for filling the pneumatic system 1001 by way of the pneumatic main line 200 and also the further pneumatic line 600.

The pneumatic system 1001 illustrated in FIG. 3 in the form of an air suspension system comprises in this case a number of four so-called bellows 1011, 1012, 1013, 1014 that are allocated in each case to a wheel of a passenger car, not further illustrated, and form an air suspension of the vehicle. Furthermore, the air suspension system comprises a storage device 1015 for storing quickly available compressed air for the bellows 1011, 1012, 1013, 1014. A solenoid valve 1111, 1112, 1113, 1114 is arranged in each case upstream of the bellows 1011 to 1014 in respectively one of the suspension branch lines 601, 602, 603, 604 that branch off from a distributing arrangement 610, each solenoid valve being used as a level controlling valve for opening or closing an air suspension that is configured with a bellows 1011 to 1014. The solenoid valves 1111 to 1114 in the suspension branch lines 601 to 604 are configured as 2/2 directional control valves. A solenoid valve 1115 in the form of a further 2/2 directional control valve is arranged as a storage device valve upstream of a storage device 1015 in a storage device branch line 605. The solenoid valves 1011 to 1014 are connected by means of the suspension and storage device branch lines 601 to 604 and/or 605 to a common collecting line, namely the previously described distributing arrangement 610, and then to the further pneumatic line 600. The distributing arrangement 610 is thus pneumatically connected by way of the pneumatic line 600 to the compressed air connection 2 of the compressed air supply system 1000. In the present case, the solenoid valves 1111 to 1115 are arranged in a valve block 1010 having five valves. The solenoid valves are illustrated in FIG. 2 in a non-energized state—the solenoid valves 1111 to 1115 are formed as non-energized closed solenoid valves. Other modified embodiments, not illustrated here, can achieve a different arrangement of solenoid valves—it is also possible to use fewer solenoid valves within the scope of the valve block 1010.

In order to fill the pneumatic system 1001, the solenoid valves 1111 to 1114, which are arranged upstream of the bellows 1011 to 1014, and/or the solenoid valve 1115 that are arranged upstream of the storage device 1015 are moved into an open position. Nevertheless, when the solenoid valves 1111 to 1114 and/or 1115 are in the open (and also closed) position in the pneumatic system 1001—as a result of the non-return valve 311 that in this case is not unlocked—it is also possible to decouple an operating position of the pneumatic system 1001 from the compressed air supply system 1000. In other words, in the case of a closed non-return valve 311, the solenoid valves 1111 to 1114 are randomly opened and closed so that an independent operation of the pneumatic system 1001 is possible. In particular, it is possible to cross-switch the bellows 1011 to 1015 (for example in the off-road operation of a vehicle), to fill the bellows 1011 to 1015 from the storage device 1015 or to measure the pressure in the pneumatic system 1001 by way of the distributing arrangement 610 without the compressed air supply system 1000 being influenced by pressure. In particular, as a result of the non-return valve 311, which is blocked by the compressed air connection 2 to the compressed air supply line 1, and of the closed control valve 320, the air dryer 100 is protected from being unnecessarily influenced by compressed air. In an advantageous manner, it is not advantageous to influence the air dryer 100 with compressed air in each operating position of the pneumatic system 1001. On the contrary, it is advantageous for an effective and rapid regeneration of the air dryer system 100 if this is performed exclusively when ventilating the pneumatic system 1001 from the compressed air connection 2 to the compressed air supply line 1; in this case with an unlocked non-return valve 311. In addition,—as explained above—the control valve 320 is moved into an open switch position so that both the ventilation valve 312 is open and also the non-return valve 311 is unlocked. It is possible to ventilate the pneumatic system 1001 by way of the first restrictor 331, the unlocked non-return valve 311 whilst regenerating the air dryer 100 and subsequently by way of the second restrictor 332 and the open ventilation valve 312 to the ventilation connection 3. In other words, a control piston 314 that can be pneumatically controlled by the control valve 320 and can be configured for example as a stepped relay piston is provided for the simultaneous unlocked actuation of the non-return valve 311 and for the opening actuation of the ventilation valve 312.

FIG. 4 illustrates in a diagram of the view (A) the two stage compressor 400 having a first compressor stage 401 and a second compressor stage 402 and also the electric motor 500 for forming a compressor 400'. As is evident in view (B) in FIG. 4, the electric motor 500 is operated by way of an open-loop control unit 900 that is first illustrated in FIG. 3 and comprises an electronic control module 910 having a control component 911 in the form of a micro-controller and a program module 912 having an executable computer program product. The program module can be stored in a storage device 913 of the control module 910. The open loop control unit 900 comprises furthermore a closed-loop control module 920 having a first closed-loop control unit 921 for controlling an operating current and a second closed-loop control unit 922 for controlling a rotational speed of the compressor motor M. Furthermore, the open-loop control unit 900 comprises an analyzing unit 930 that is configured so as to ascertain an actual rotation speed nk-IST of the compressor motor M or of the compressor 400 from a time curve of an operating current of the electric motor 500. The open-loop control unit 900 is allocated a switch controller 901 that is configured so as to specify a switched-on time period (t_ON) and/or a switched-off time period (t_OFF) for the electric motor (500) in a variable manner.

The previously mentioned exemplary list of units and modules of an open-loop control unit 900 is in particular not complete; on the contrary, the open-loop control unit 900 can comprise further open-loop control, closed-loop control and analyzing units that are expediently used to open-loop control and/or closed-loop control the compressor 400, in particular the compressor motor M. Furthermore, a grouping illustrated in FIG. 4(B) of modules and units is only intended as an example and for illustrating the principle of an open-loop and closed-loop control unit 900.

Figure 4A:
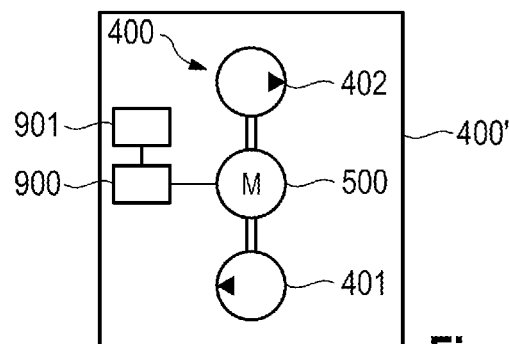
FIG. 4 illustrates in view (B) a system structure of an electronic control unit for a compressor that is illustrated in view (A) as it is provided for a compressed air supply of the compressed air supply system shown in FIG. 2, wherein the electronic control unit inter alia comprises an electronic open-loop control module and a closed-loop control module and an analyzing unit and in view (C) a detailed system structure of a modified electronic control unit for a compressor that is illustrated in view (A)
Figure 4B:
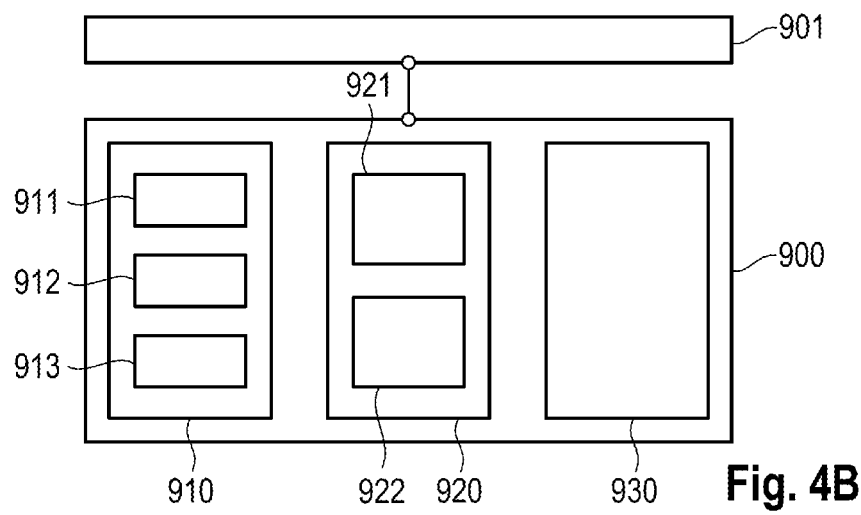
Figure 4C:
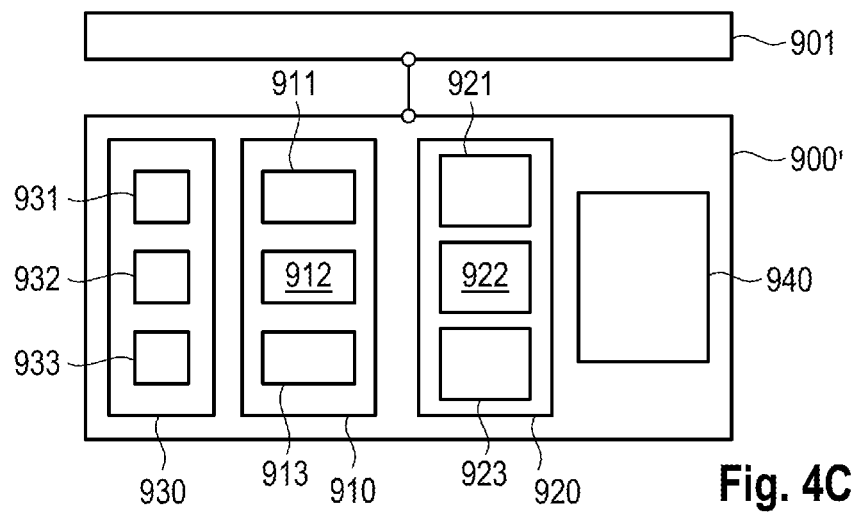

Another exemplary variant of an open-loop and closed-loop control unit 900' is illustrated in FIG. 4(C). The control unit 900' is again allocated a switch controller 901 that is configured so as to specify a switched-on time period (t_ON) and/or a switched-off time period (t_OFF) for the electric motor 500 in a variable manner. This comprises in a similar manner as already the open-loop and closed-loop control unit 900 in FIG. 4(B), the previously mentioned control module 910 having a control component 911 such as a micro-controller or the like, a program module 912 and a storage device 913. Furthermore, a closed-loop control module 920 of the open-loop and closed-loop control unit 900' provides a closed-loop control unit 921 for the start-up phase of the compressor motor M. In particular, the closed-loop control unit 921 is configured so as to control the start-up current of the operating current IB, in other words the operating current IB in the start-up phase AnP. Furthermore, the closed-loop control module 920 comprises a closed-loop control unit 922 for the load phase LaP. In particular, the closed-loop control unit 922 is configured so as to control a rotational speed nK of the compressor motor M. Furthermore, the closed-loop control module 920 comprises a closed-loop control unit 923 for a deceleration or switching-off phase AusP of the compressor motor M. In particular, the closed-loop control unit 923 is configured so as to control a switching-off current of the operating current IB, in other words an operating current IB in the switching-off phase AusP.

The analyzing unit 930 is furthermore configured so as to ascertain ACTUAL-values of parameters of the compressor motor M. In particular, the analyzing unit 930 comprises an input module 931 that is configured so as to implement an ACTUAL-value demand at the compressor motor M. A further input module 932 is configured so as to receive an ACTUAL-value of the operating current IB of the compressor motor M. A further receiving module 933 is configured so as to receive a value of the operating voltage of the compressor motor M, in particular an ACTUAL-value of the operating voltage UB. Furthermore, the open-loop and closed-loop control unit 900' illustrated in FIG. 4(C) comprises a switching unit 940 for implementing an actuating element; the unit 940 can comprise in addition a suitable number of semiconductor switches. In particular a previously mentioned control component 911 in the form of a micro-controller and/or a semiconductor switch of the actuating element can be configured on the basis of one or multiple MOSFET components.

The functionality of the open-loop and closed-loop control unit 900, 900' is essentially integrated in the control module 910 (that brings together in particular the functionalities of the control component 911 and of the executable program module 912) and the analyzing unit 930, where appropriate assisted by the closed-loop control module 920. The functionality of the control unit 910, as is implemented for execution on the control component 911, comprises essentially three categories, namely a functionality for a start-up phase AnP, a load phase LaP and a switching-off phase AusP.

In the switching-off phase AusP, a functionality for a switch-off threshold current is provided in the switching-off phase AusP.

In particular, it is possible to provide different time sections during the start-up phase AnP and the switching-off phase AusP, said different time sections being allocated different current ramps and threshold currents and consequently start-up and switch-off limit functions GF are allocated to the operating currents BI. In relation to this, reference is made to an example in DE 10 2012 024 400 A1.

FIG. 5 illustrates schematically the detailed circuit diagram of an open-loop control unit 900 (host system driver) in combination with a switch controller 901 (controller) as these are already illustrated schematically in FIG. 2, FIG. 3 and also FIG. 4a, FIG. 4b and FIG. 4c. A device for controlling the motor 500 that is connected to a power supply 501 therefore provides the controller of the operating current IB; this together with the mentioned coupling of the control unit 900, 900' and switch controller 901. The controller comprises furthermore in a free-running current path 902 an FET power transistor and a free-wheeling diode D. The transistor is advantageous in order to switch off the current delimiting element, in particular in a free-running current path, and consequently to protect the diode. It is to be noted in this respect that from the technical point of view although the control unit 900, 900' in particular delimits the current, at this point and also hereinunder the current delimiting element, in particular in a free-running current path 902, is referred to as such a unit.

It is immediately obvious that on the one hand the operating current IB should be sufficient to control the motor 500 in order to guarantee a quick as possible start-up of the motor 500; on the other hand the maximum operating current IB-Max illustrated in FIG. 1 and the start-up ramp (ramp up) of the operating current IB should not be too high or rather too steep. However, during the start-up phase this current consumption depends directly on the motor characteristics and upon the flange-mounted compressor and cannot be influenced by the direct switching-on procedure. The features of this invention are necessary in order to achieve a current consumption that suits the requirement according to FIG. 7.

The control unit 900, 900' in this embodiment is configured so as to configure the operating current IB as a function of the switched-on time period t_ON—an example of this is illustrated in the following FIG. 7.

As a result of the induction effect for the operating current IB, said induction effect being associated with the switching off procedure, the procedure of switching off the motor associated with the open-loop and closed-loop control of the operating current IB results in the fact that it is possible for an excess current to occur—in the switching-off procedure. This excess current must be borne, i.e. converted into resistance heat, by the free-running current path 902—in other words the free-wheeling diode D that is provided in combination with the power transistor FET. These losses, described here as dissipation energy, should nevertheless not be too high.

On the other hand, the free-running current path 902 must be configured to suit the anticipated dissipation energies. This dissipation energy can be purposefully controlled by virtue of configuring the operating current IB as a function of the switched-off time period t_OFF so that one the one hand it is possible to configure the free-running current path 902 in an appropriate manner and to reduce the dissipation energy. The operating current IB (t_OFF) in this example of an embodiment is illustrated symbolically as a current loss through the free-running current path.

The switched-on time period t_ON and the switched-off time period t_OFF are illustrated symbolically as control variables in the open-loop and closed-loop control circuit R900 of the controller—from a coupling of the control unit 900, 900' and the switch controller 901.

In an embodiment, the switch controller 901 is supplied with a measurement value for the operating current IB and a measurement value for the operating voltage UB as ACTUAL-values IB_IST and UB_IST. Depending on the value of the ACTUAL-values IB_IST and UB_IST, the switch controller 901 establishes a dynamically changeable control signal CS that specifies the switched-on time period t_ON and the switched-off time period t_OFF.

This control signal CS can be fundamentally configured in a fully dynamic manner in dependence upon the prevailing operating currents and operating voltages IB_IST and UB_IST. However, a switched-on time period t_ON and a switched-off time period t_OFF can also be specified in a variable but fixed manner for specific time sections.

It has been fundamentally tried and tested, by way of example during a start-up phase (ramp up), to specify the switched-on time period in a variable fixed manner with increasing values for a pre-determinable ramp of an operating current that is to be increased for the motor 500 and to configure the switched-off time period t_OFF in a dynamically variable manner as a function of the prevailing operating currents IB. In other words,—as illustrated by way of example in FIG. 7—, by way of example a linear increase in the switched-on time period t_ON would be specified for a ramp up of the motor 500 so that a threshold current limit function is produced as a linear characteristic for starting up the motor 500. The free-running current path 902 is adjusted to suit this, in that nevertheless excess current peaks can be dissipated as resistance heat. Furthermore, an operating current IB (t_OFF) can be limited as a function of the switched-off time period in the free-running current path; this therefore limits the dissipated energy in the free-running current path 902.

The control signal CS therefore represents together with the combination of the switched-off time period t_OFF and the switched-on t_ON a compromise between the requirement to start up the motor 500 with the delimiting current ramp nevertheless as high as possible current amplitudes and consequently comparatively quickly and yet dissipate as little energy as possible in the free-running current path 902.

Embodiments of the invention render it possible to purposefully configure the components in particular in the free-running current path so that an over-dimensioning can be avoided and consequently this can be used to save costs.

Figure 6:
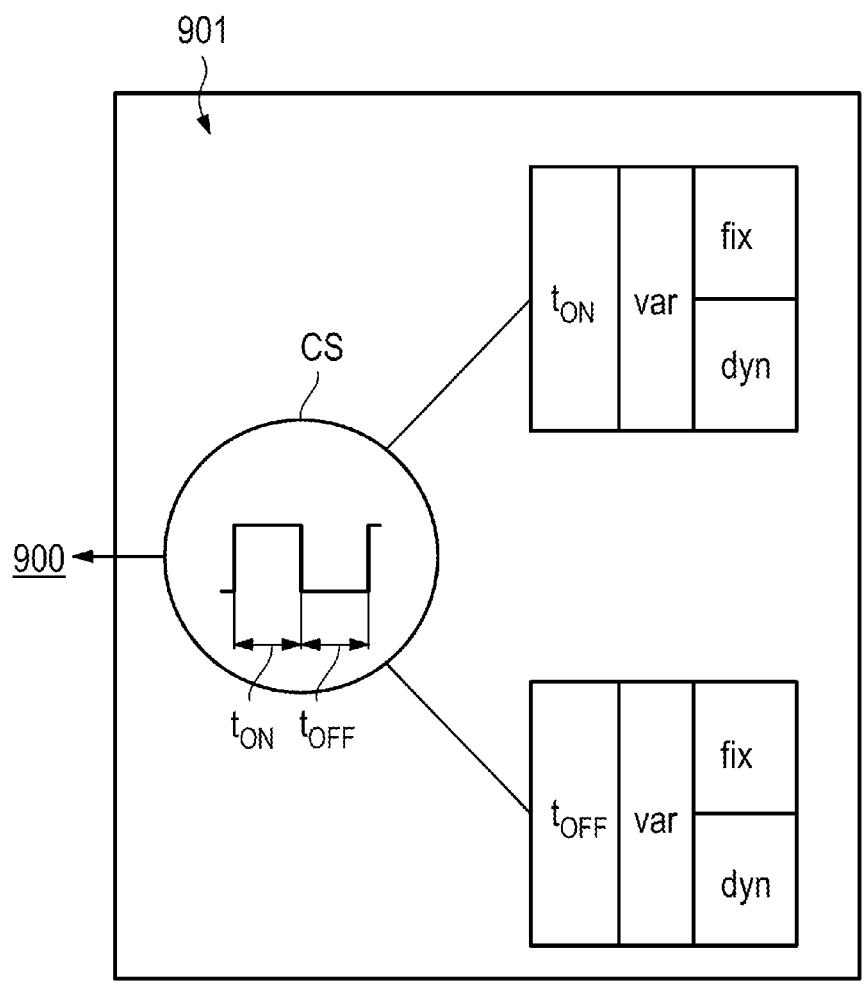
FIG. 6 illustrates a fundamental function diagram of the switch controller 901 for specifying a switched-on time period t_ON and/or a switched-off time period t_OFF for the electric motor within the scope of the closed-loop and open-loop control circuit having the open-loop control unit 900 as is illustrated in FIG. 5.

FIG. 6 illustrates as an example and identified by the prime marker, the combination of functions of a switched-on time period t_ON as a variable but fixed specification in the closed-loop control circuit R900 and further illustrates the operating current-dependent control of the switched-off time period t_OFF as dynamically variable variables in the open-loop and closed-loop control circuit R900, said functions being combined in the switch controller 901. Moreover, the switched-on time period t_ON can also be used as an operating current-dependent control in a dynamically variable manner.

The control signal CS is transmitted to the control unit 900, 900' for the electric motor 500 and specifies the switched-on and switched-off characteristic curve of the motor, so to say as a time variable PWM signal. It is possible using this method to optimize in particular the operating behavior of the motor 500, in other words the switched-on time period t_ON can be specified in an optimum manner so that the motor 500 starts up at an optimized start-up rate; corresponding current ramps and current amplitudes of the operating current IB are consequently in the range of the borderline limit values.

Furthermore, it is possible by controlling the switched-off time period t_OFF to direct the energy dissipation in the free-running current path 902 as far as the limit of the component configuration, in other words within the permitted limit range. The algorithm illustrated in FIG. 6 in combination with FIG. 5 therefore substantiates the requirements that are in principle contradicting: on the one hand to use in the free-running current path components that are comparatively only slightly over-dimensioned and are therefore cost-effective and yet to limit the current amplitudes and gradients in a sufficient manner.

Figure 7:
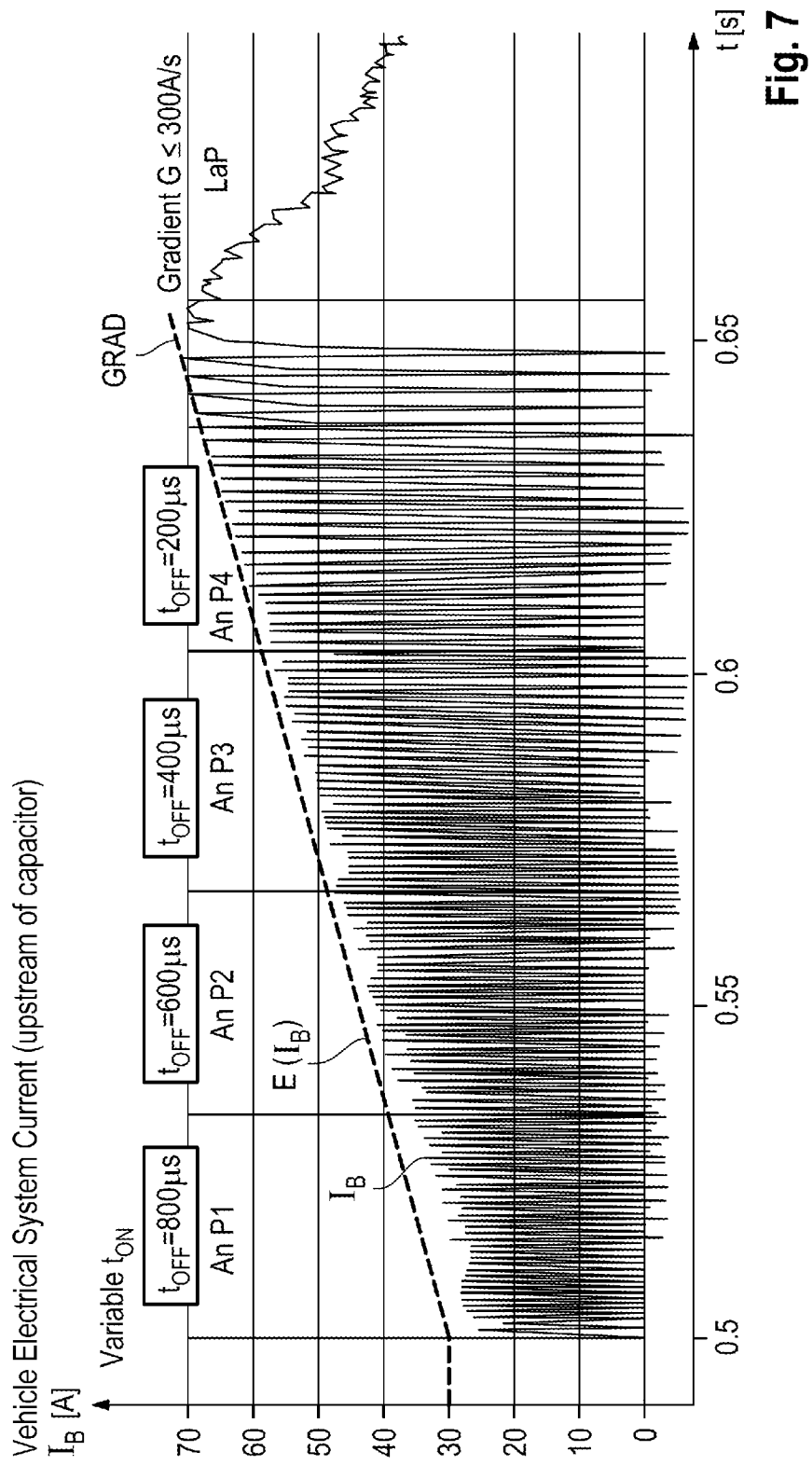
FIG. 7 illustrates an example of a compressor start-up having a current ramp that is specified by the control unit and is achieved by means of a variable PWM control procedure that is configured for four time sections, wherein however in addition the inventive coupling of the control unit to the switch controller 901 within the scope of an open-loop and closed-loop control circuit specifies the switched-on time period and in particular the switched-off time period in a variable manner in order in addition to maintain the energy dissipation in the free-running current path at a small as possible value—as a result, the switched-off time period in the case of an increasing operating current is reduced within the scope of the start-up ramp of the electric motor.

FIG. 7 illustrates a measurement demonstration for a ramp up phase, in other words a start-up of an electric motor 500 in accordance with the above mentioned description. FIG. 7 illustrates in addition the operating current IB in amps as a function of time tin seconds. The figure initially illustrates the gradient that is identified by GRAD and relates to the start-up envelope E(IB) for the operating current IB, in other words its threshold current limit function GE.

The operating current IB itself as a function of time has a sequence of amplitude peaks that can be described by the so-called start-up envelope E(IB) and that lie below said envelope and in addition follow the said ramp GRAD.

The method that is based on this provides for a specification of the switched-on time periods t_ON that are specified and predetermined in a variable dynamic manner as a function of the operating current IB changeable in the present example with preferred four time phases AnP1, AnP2, AnP3 and AnP4. In particular, the operating current IB is ascertained or derived during the switched-on time period t_ON continuously by the switch controller 901 and coupled to the control signal CS, namely by way of the previously described program module 912 and the control component 911 of the control module 910 in the open-loop control unit 900. Reference is made in this respect to the disclosure of DE 10 2012 024 400 A1—and there in particular to the exemplary methods, as are described in FIG. 5 to FIG. 9 thereof. The start-up phase AnP4 is followed by a load phase LaP with a reducing current; the electric motor 500 is operating in the nominal operation mode during the load phase LaP.

The switched-off time period t_OFF can be changed in a variable dynamic manner as a function of the operating current IB during the start-up phase (ramp up phase) in the four time phases AnP1, AnP2, AnP3 and AnP4. It has proven particularly advantageous to implement the switching-off times or the respective switched-off time period t_OFF that are allocated to the time phases AnP1, AnP2, AnP3 and AnP4 with the correspondingly adjusted values of the operating current IB. This leads to the fact that in each time phase AnP1, AnP2, AnP3 and AnP4 the dissipated energy in the free-running current path 902 is as small as possible and in any case below the overload limit of the components being used in the free-running current path. Consequently, the free-running current path 902 is reliably prevented from overheating and the components are even prevented from malfunctioning. The free-running current path 902 therefore fulfills its function of safeguarding the current delimitation in the long term.

It has specifically been demonstrated that, in the first start-up time section AnP1 of 800 µs, the operating current IB of the electric motor is still comparatively small and in the range of 30 A to 40 A—a comparatively long switched-off time period of t_OFF=800 µs is possible here in the case of a comparatively small start-up current of 30 A and the said current gradient below 300 A/s. The switched-off time period t_OFF can fundamentally also be configured in a variable fixed manner and specified to the value of 800 µs for example.

In a similar manner, in the further start-up time sections AnP2, AnP3 and AnP4, an adjusted reducing value of the switched-off time period t_OFF is specified in a variable but fixed manner or it is adjusted in a variable dynamic manner as a function of the operating current. In the second start-up time section AnP2 it amounts to 600 µs, in the third AnP2 400 µs and in the fourth AnP4 200 µs; this in the case of an increasing operating current of up to 70 A. This increase in the switched-off time period t_OFF reduces in addition the energy dissipation in the free-running current path 902. In the event of a procedure controlling the rotational speed, this value of the switched-off time period t_OFF in the load phase LaP can be maintained equal to 200 µs in order to maintain the loading on the free-running current path as small as possible even in the case of reducing currents.

Figure 8:
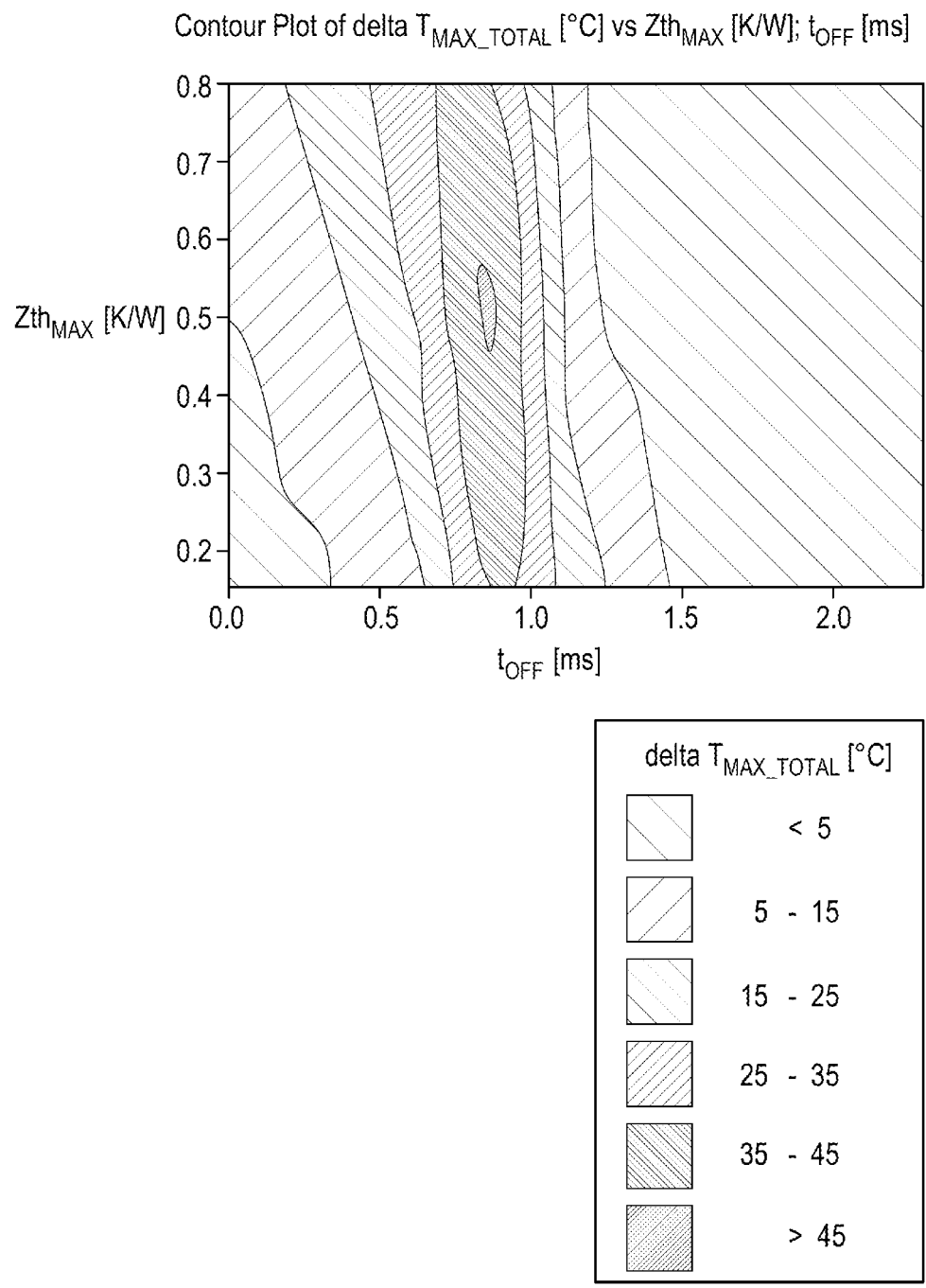
FIG. 8 illustrates a simulated two-dimensional chart relating to the temperature increase in the free-running current path in dependence upon the switched-off time period in accordance with an embodiment of the invention during a switching-off phase (ramp down) for an electric motor.

FIG. 8 illustrates a first example of a calculation of a temperature increase as a function of the switched-off time period t_OFF during a ramp down phase, in other words during a procedure of switching off an electric motor and a corresponding control procedure. In the illustrated range of a switched-off time period t_OFF between 200 µs and 800 µs, the energy dissipation in the free-running current path is controlled without it increasing too greatly even if a variation in the time range by 1000 µs is evident.

Nevertheless, the temperature increase of all the components in the free-running current path 902 does not exceed 40 Grad Kelvin, which leads to a maximum anticipated temperature in the FET or in the diode of by way of example 130° C. in the case of an ambient temperature of 80° C. The maximum temperature in the switching procedure of the FET is at the most 175° C. and is not exceeded.

Figure 9:
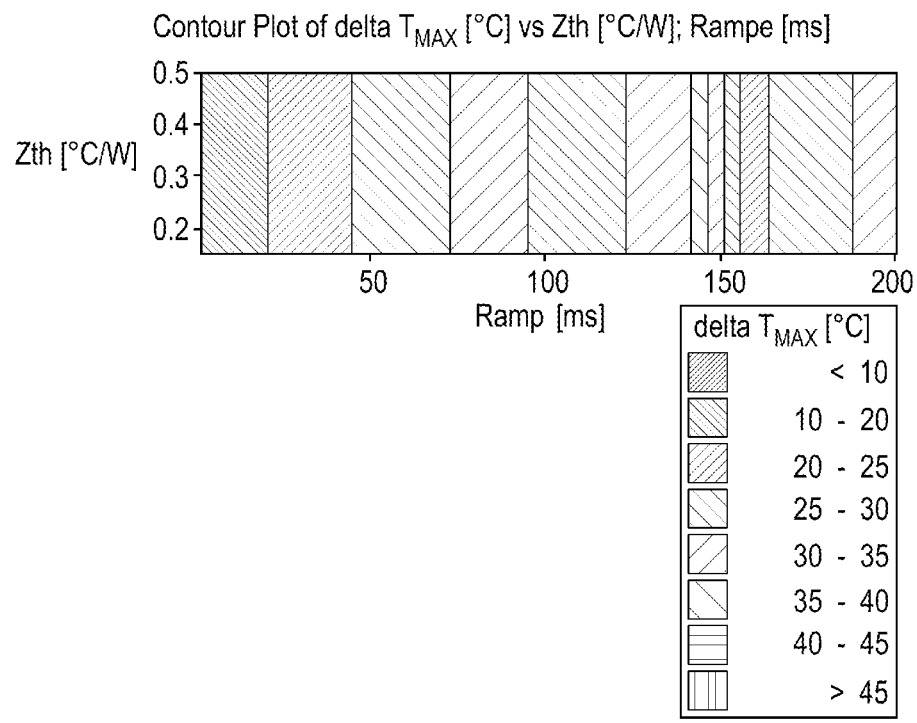
FIG. 9 illustrates a similar chart of a temperature increase as a function of the switched-off time period during a starting-up phase of the electric motor (ramp up phase).
Figure 9:
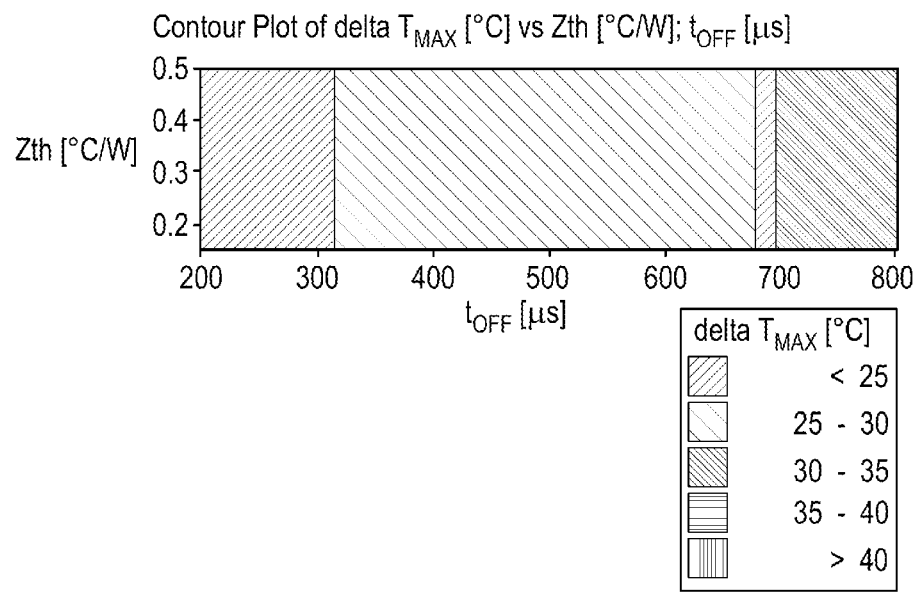

FIG. 9 illustrates the temperature increase in the free-running current path 902 once in the upper region as a function—a ramp GRAD in milliseconds and in the lower region as a function of the switched-off time period t_OFF in milliseconds.

In the control range of a current ramp below 300 A/s and in the region of the controllable switched-off time period t_OFF=200, 800 µs (in other words for the example in FIG.

7) only a theoretical temperature increase of below 35 Kelvin is evident, which would lead to a maximum to be expected temperature in a component (FET or diode D) of a maximum 125° C. in the case of an ambient temperature of 80° C. The maximum switching procedure temperature of 175° C. for the FET or the diode is not exceeded.

Consequently, the results illustrated in FIG. 7 and proven in FIG. 8 and FIG. 9 demonstrate that the operation of an electric motor 500 having an open-loop and closed-loop control circuit coupling for a control unit 900, 900' and switch controller 901 renders possible in the end effect a dynamically variable PWM control and delimitation of the inductive loads of an electric motor especially for a compressor operation of a compressor; namely whilst optimizing on the one hand the dynamics of the compressor, in particular during the start-up procedure, and simultaneously reducing the losses in dissipated energy. The concept renders possible the sustainable and long-term use of appropriately configured components in the free-running current path without said components having to be excessively overdimensioned. This leads overall to a considerable cost saving and efficient configuration of a controller for an electric motor 500 for a compressor 400, 400'.

While the invention has been illustrated and described in detail in the drawings and foregoing description, such illustration and description are to be considered illustrative and exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

0 Air supply duct
0.1 Filter element
1 Compressed air supply line
2 Compressed air connection
3 Ventilation connection
100 Air dryer
100' Dryer module
140 Dryer container
180 Air dryer
200 Pneumatic main line
230 Branch line
240 Ventilation line
250 Pneumatic control line
251 Line section
260 Ventilation line
261 Branch connection
300 Valve arrangement
301 Flange
301' Air distributing module
310 Directional control valve arrangement
310' Valve housing module
311 Non-return valve
312 Ventilation valve
313 Pressure delimiter
314 Piston
315 Spring
320 Solenoid valve, control valve
321 Control line
322 Coil
330 Booster valve
330' Booster valve housing module
331 First restrictor
332 Second restrictor
400 Compressor
400' Compressor
401 First compressor stage
402 Second compressor stage
500 Electric motor
600 Pneumatic line
601, 602, 603, 604 Suspension branch line
605 Storage branch line
610 Distributing arrangement
700 Mounting
710 Spring bearings
720 Fastening connections
900, 900' Open-loop control unit, closed-loop control unit
901 Switch controller
902 Current delimiting element (free-running current path)
910 Control module
911 Control component
912 Program module
913 Storage device
920 Closed-loop control module
921 First closed-loop control unit
922 Second closed-loop control unit
930 Analyzing unit
923 Third closed-loop control unit
931, 932, 933 Input module
940 Actuating element
1000 Compressed air supply system
1001 Pneumatic system
1002 Compressed air supply system
1010 Valve block
1011, 1012, 1013, 1014 Four bellows
1015 Storage device
1111, 1112, 1113, 1114 Solenoid valve
A1, A2 Connection plane, connection face
AnP Start-up phase
AnP1, AnP2, Anp3, Anp4 First, second, third, fourth start-up time section
LaP Load phase
AusP Switching-off phase
G Housing arrangement
GF Threshold current limit function
Grad Gradient
IB Operating current
E(IB) Envelope
M Compressor motor, electric motor
CS Control signal UB Operating voltage (Motor 500)
t Time
t_ON Switched-on time period
t_OFF Switched-off time period
PWM PWM characteristic curve
R Closed-loop control loop

The invention claimed is:

1. A compressor system for generating compressed air for a compressed air supply system in a vehicle, the compressor system comprising:
   a brushed direct current electric motor (BDC electric motor);
   a compressor configured to be driven by the BDC electric motor; and
   a motor control circuit configured to delimit an operating current of the BDC electric motor to a time-varying current threshold value, the motor control circuit including:
      a free-running current path, the free-running current path being connected in parallel to the electric motor, the free-running current path including a free-wheeling diode and a MOSFET power transistor having an integrated free-wheeling diode, and
      a switch controller, the switch controller being configured to specify, in a time-varying manner, a switched-on time period (t_ON) and a switched-off time period (t_OFF) for the electric motor,
   wherein the switched-off time period is determined as a function of the time-varying current threshold value so as to limit an amount of energy dissipated in the free-running current path to a dissipated energy threshold value.

2. The compressor as claimed in claim 1, wherein the motor control circuit comprises an electronic control module including a control component and an executable program module.

3. The compressor as claimed in claim 2, wherein the electronic control module is configured to specify the time-varying current threshold value.

4. The compressor as claimed in claim 3, wherein the electronic control module further comprises an analyzing unit configured to determine whether the operating current of the BDC electric motor has reached the time-varying current threshold value and/or an actuating element configured to interrupt a supply of operating energy to the electric motor according to a predetermined interruption frequency when the operating current of the BDC electric motor has reached the time-varying current threshold value.

5. The compressor as claimed in claim 2, wherein in order to delimit the operating current, the executable program module is configured to specify, as a function of time, the time-varying current threshold value, and wherein the control component is configured to interrupt a supply of operating energy or operating voltage to the electric motor.

6. The compressor as claimed in claim 2, wherein the electronic control module is configured to control a soft start-up.

7. The compressor as claimed in claim 2, wherein the electronic control module is further configured to control a soft switching-off procedure to specify a switch-off operating current that is delimited in a variable manner with respect to time.

8. The compressor as claimed in claim 1, wherein the motor control circuit and the switch controller are coupled within a closed-loop and/or an open-loop control circuit, wherein the switch controller is configured to:
   receive an operating current measurement for the electric motor and/or an operating voltage measurement for the electric motor, and
   output, via a control signal, the switched-on time period (t_ON) and the switched-off time period (t_OFF).

9. The compressor as claimed in claim 8, wherein the motor control circuit further comprises a first closed-loop control unit that is configured to control the operating current of the electric motor while specifying the time-varying current threshold value as a DESIRED-current.

10. The compressor as claimed in claim 8, wherein the motor control circuit further comprises a closed-loop control module having a second closed-loop control unit that is configured to control a rotational speed of the electric motor while specifying a rotational speed upper limit that is (i) constant time section-by-time section as a function of the operating current or (ii) a variable that is derived from the operating current.

11. The compressor as claimed in claim 1, wherein the switch controller is configured so as to specify the switched-on time period (t_ON) and/or the switched-off time period (t_OFF) in a variable but fixed, or in a variable and dynamically changeable, manner.

12. The compressor as claimed in claim 1, wherein the switch controller is configured to maintain the operating current for the electric motor at a value below a maximum limit current of $I\_max=30A$ and/or to maintain a gradient of the operating current for the electric motor at a value below a maximum limit gradient of the operating current of $G\_max=300A/s$.

13. The compressor as claimed in claim 1, wherein the switch controller is configured to specify the switched-off time period (t_OFF) so as to maintain a temperature in the free-running current path to a value below 20° C. in excess of an ambient temperature of 40° C. to 100° C., to maintain an absolute temperature in the free-running current path to a value below 130° C., and/or to maintain a junction temperature in the free-running current path to below 170° C.

14. The compressor as claimed in claim 1, wherein the switch controller is configured to specify the switched-on time period (t_ON) and/or the switched-off time period (t_OFF) to values of 200 µs or less.

15. The compressor as claimed in claim 1, wherein the compressor is a two-stage compressor having at least a first and a second compressor stage.

16. The compressor as claimed in claim 1, wherein the motor control circuit is configured to interrupt a supply of operating energy to the BDC electric motor in accordance with the switched-on time period (t_ON) and the switched-off time period (t_OFF).

17. The compressor as claimed in claim 1, wherein a start-up phase including a soft start-up of the compressor transitions to a load phase, and/or a load phase transitions to a deceleration phase including a control of the operating current of the compressor.

18. The compressor as claimed in claim 1, wherein the motor control circuit is configured to delimit a rotational speed variability of the electric motor as a function of the operating current or of a variable that is derived from the operating current by way of a pulse width modulation (PWM) characteristic curve the PWM characteristic curve being an effective voltage ramp stored in the program module and being a function of the operating current.

19. The method as claimed in claim 18, wherein the switched-off time period (t_OFF) is reduced for an increased operating current and/or increased operating voltage of the BDC electric motor.

20. The compressor system as claimed in claim 1, wherein, in the free-running current path, the free-wheeling diode is connected in series with the MOSFET power transistor.

21. The compressor system as claimed in claim 1, wherein the motor control circuit includes a switch configured to, sequentially, connect, for the switched-on time period (t_ON), a power supply to the BDC electric motor and disconnect, for the switched-off time period (t_OFF), the power supply to the BDC electric motor.

22. The compressor system as claimed in claim 21, wherein the switch is a semiconductor switch.

23. A compressed air supply system for a vehicle, the compressed air supply system comprising:
 a compressed air supply line having a compressor system, the compressor system including:
  a brushed direct current electric motor (BDC electric motor);
  a compressor configured to be driven by the BDC electric motor;
  a motor control circuit configured to delimit an operating current of the BDC electric motor to a time-varying current threshold value, the motor control circuit including:
   a free-running current path, the free-running current path being connected in parallel to the electric motor, the free-running current path including a free-wheeling diode and a MOSFET power transistor having an integrated free-wheeling diode, and
   a switch controller, the switch controller being configured to specify, in a time-varying manner, a switched-on time period (t_ON) and a switched-off time period (t_OFF) for the electric motor, wherein the switched-off time period is determined as a function of the time-varying current threshold value so as to limit an amount of energy dissipated in the free-running current path to a dissipated energy threshold value;
 a compressed air connection;
 a ventilation connection to the environment;
 a first pneumatic connection between the compressed air supply line and the compressed air connection, the first pneumatic connection including an air dryer and a separating valve; and
 a second pneumatic connection between the compressed air connection and the ventilation connection.

24. A pneumatic system, comprising:
 the compressed air supply system as claimed in claim 23;
 a distributing arrangement;
 at least one branch line that is connected in a pneumatic manner to the distributing arrangement;
 a bellows and/or a storage device; and
 a directional control valve that is arranged upstream of the bellows and/or the storage device,
 wherein the pneumatic system is an air suspension system.

25. A method for operating a brushed direct current electric motor (BDC electric motor) in a compressor system for generating compressed air for a compressed air supply system of a vehicle, the method comprising:
 driving a compressor of the compressor with the BDC electric motor;
 controlling, by a motor control circuit, the BDC electric motor so as to delimit an operating current of the BDC electric motor to a time-varying current threshold value, wherein the motor control circuit includes a free-running current path connected in parallel to the electric motor, the free-running current path including a free-wheeling diode and a MOSFET power transistor having an integrated free-wheeling diode, and
 specifying, by a switch controller in a time-varying manner, a switched-on time period (t_ON) and a switched-off time period (t_OFF) for the electric motor,
 wherein the switched-off time period (t_OFF) is determined as a function of the time-varying current threshold value so as to limit an amount of energy dissipated in the free-running current path to a dissipated energy threshold value.

26. The method as claimed in claim 25, wherein the switched-off time period (t_OFF) is determined so as to limit an amount of heat absorption in the free-running path.

27. The method as claimed in claim 25, wherein the BDC electric motor is controlled by an electronic control module of the motor control circuit, and wherein the electronic control module comprises a control component having an executable program module.

28. The method as claimed in claim 27 wherein the time-varying current threshold value is specified as a function of time, and wherein the control component is configured to interrupt a supply of operating energy to the electric motor in a variable manner in accordance with the switched-on time period (t_ON) and/or the switched-off time period (t_OFF).

29. The method as claimed in claim 25 wherein the switched-on time period (t_ON) and/or the switched-off time period (t_OFF) are specified by the switch controller for the BDC electric motor in a variable manner and in dependence upon a measured operating current and/or a measured operating voltage of the BDC electric motor.

\* \* \* \* \*